United States Patent
Memon et al.

(10) Patent No.: US 11,748,152 B2
(45) Date of Patent: *Sep. 5, 2023

(54) VIRTUALIZATION OF MULTIPLE COPROCESSORS

(71) Applicant: VMware, Inc., Palo Alto, CA (US)

(72) Inventors: Mazhar Memon, Austin, TX (US); Subramanian Rama, Austin, TX (US); Maciej Bajkowski, Austin, TX (US)

(*) Notice: Subject to any disclaimer, the term of this patent is extended or adjusted under 35 U.S.C. 154(b) by 17 days.

This patent is subject to a terminal disclaimer.

(21) Appl. No.: 17/503,998

(22) Filed: Oct. 18, 2021

(65) Prior Publication Data

US 2022/0035654 A1    Feb. 3, 2022

Related U.S. Application Data

(63) Continuation of application No. 16/737,655, filed on Jan. 8, 2020, now Pat. No. 11,169,843, which is a continuation of application No. 15/643,428, filed on Jul. 6, 2017, now Pat. No. 10,534,639.

(51) Int. Cl.
| | |
|---|---|
| *G06F 9/48* | (2006.01) |
| *G06F 11/30* | (2006.01) |
| *G06F 8/61* | (2018.01) |
| *G06F 11/34* | (2006.01) |

(52) U.S. Cl.
CPC ............... *G06F 9/485* (2013.01); *G06F 8/61* (2013.01); *G06F 9/4881* (2013.01); *G06F 11/3024* (2013.01); *G06F 11/3409* (2013.01); *G06F 11/3414* (2013.01); *G06F 2201/865* (2013.01)

(58) Field of Classification Search
CPC .... G06F 9/485; G06F 9/4881; G06F 11/3024; G06F 11/3414; G06F 8/61
See application file for complete search history.

(56) References Cited

U.S. PATENT DOCUMENTS

| | | | |
|---|---|---|---|
| 2010/0156888 A1 | 6/2010 | Luk et al. | |
| 2015/0128136 A1 | 5/2015 | Rafique et al. | |
| 2015/0170318 A1* | 6/2015 | Gould | G06T 1/20 345/505 |
| 2016/0085587 A1 | 3/2016 | Dube et al. | |
| 2016/0180486 A1* | 6/2016 | Rao | G06F 9/4881 345/505 |
| 2016/0246598 A1 | 8/2016 | Kenney et al. | |
| 2017/0249716 A1* | 8/2017 | Meixner | G06F 8/447 |
| 2018/0276047 A1 | 9/2018 | Lo | |
| 2018/0321859 A1 | 11/2018 | Jung et al. | |
| 2018/0330467 A1* | 11/2018 | Park | G06F 3/0659 |
| 2019/0012197 A1* | 1/2019 | Memon | G06F 8/61 |

* cited by examiner

*Primary Examiner* — Sisley N Kim
(74) *Attorney, Agent, or Firm* — Kim & Stewart LLP

(57) ABSTRACT

In a data processing system running at least one application on a hardware platform that includes at least one processor and a plurality of coprocessors, at least one kernel dispatched by an application is intercepted by an intermediate software layer running logically between the application and the system software. Compute functions are determined within kernel(s), and data dependencies are determined among the compute functions. The compute functions are dispatched to selected ones of the coprocessors based at least in part on the determined data dependencies and kernel results are returned to the application that dispatched the respective kernel.

18 Claims, 4 Drawing Sheets

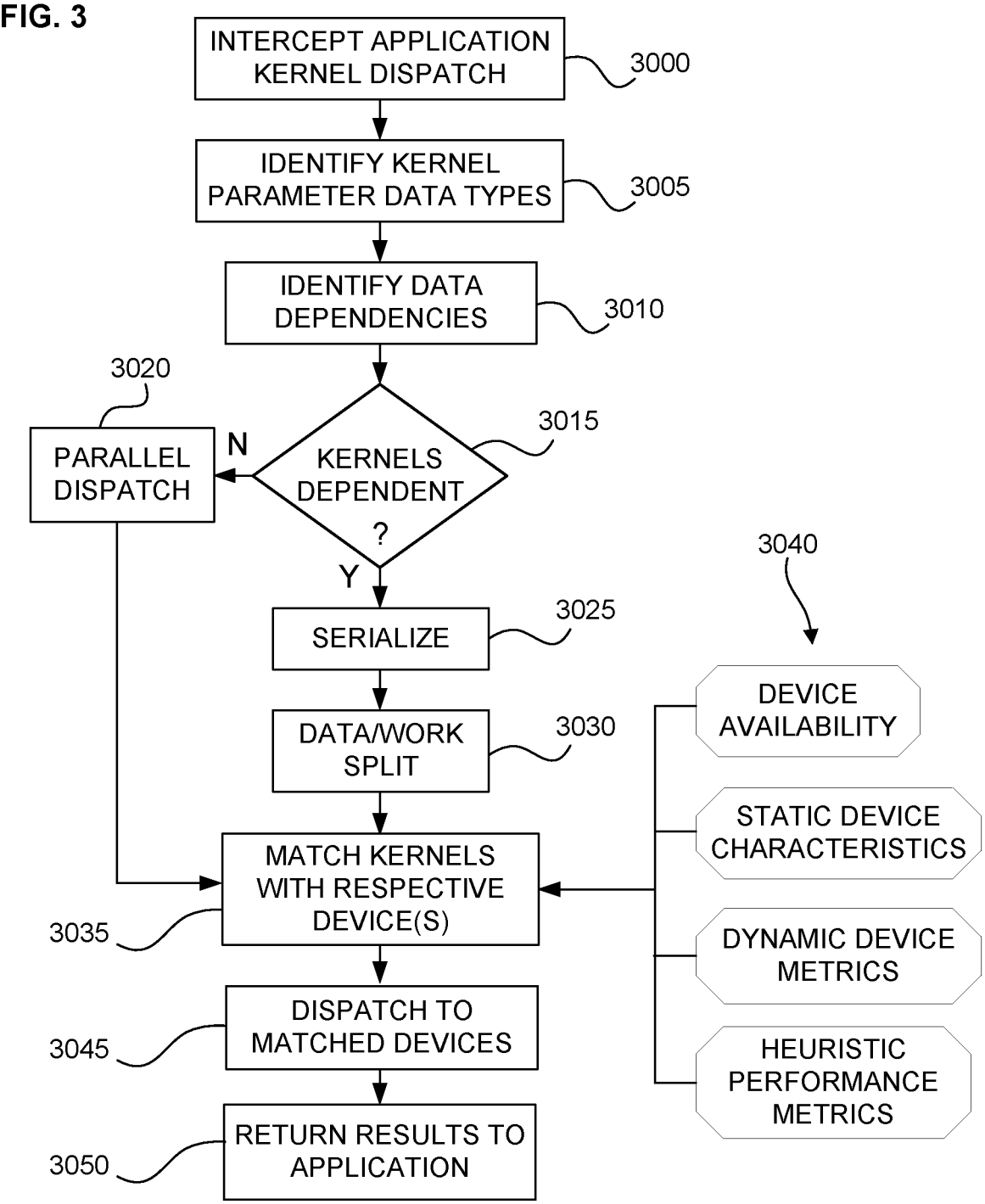

VIRTUALIZATION OF MULTIPLE COPROCESSORS

CROSS-REFERENCE TO RELATED APPLICATION

This application is a continuation of U.S. patent application Ser. No. 16/737,655, filed on Jan. 8, 2020, which is a continuation of U.S. patent application Ser. No. 15/643,428, filed on Jul. 6, 2017, now U.S. Pat. No. 10,534,639, issued Jan. 14, 2020, the entire contents of which are incorporated herein by reference.

TECHNICAL FIELD

This invention relates to computing systems that include coprocessors.

BACKGROUND

As both the extent and complexity of computer processing have grown even in everyday modern life, there is a well-known, ever-increasing need for greater processing power. In many cases, even the increases in processing capability predicted by Moore's Law is insufficient.

One way to increase processing capacity is to distribute the load. "Cloud computing" is one known distribution scheme, in which local systems access shared processing resources such as servers remotely via a network, usually on demand. Although making essentially unlimited resources available, network delays alone preclude use of such an arrangement for many computationally intensive, time-critical or synchronized tasks.

One approach to handling some such tasks is "parallel computing", in which a task is decomposed into discrete sub-tasks that can be performed simultaneously by different processing systems. Certain processing tasks involve operations that can be performed by a system's main processor, but that are so specialized that an auxiliary processor—a coprocessor—may instead be more efficient, thereby leaving the more general operations to the main processor. Coprocessors are thus frequently included in systems to perform such operations as floating point arithmetic, encryption, string processing, I/O interfacing, and signal and graphics processing. Such coprocessors may be locally and/or remotely attached.

The specialization of coprocessors offers many obvious advantages—they are, after all, designed to perform certain tasks especially well—but they also create challenges, especially when a main hardware platform is to be able to access more than one coprocessor, which may have different API protocols, may be distributed, that is, with some or all of them remote, may have unbalanced loading, etc.

Heterogeneous and "exotic" hardware systems that leverage the specialized capabilities of coprocessors promise much higher performance and efficiency for compute-intensive applications for which they are targeted. However, it has in many cases proven difficult to "scale-up" or simultaneously use more than a single coprocessor to increase efficiency and performance and accelerate applications further, especially (but not exclusively) where portability across different vendors and system configurations is necessary or desirable. These difficulties are often a barrier to adopting additional hardware since the software enablement effort is increasingly high.

What is needed is therefore a system and operational method that makes the use of one or more coprocessors more generally feasible and useful.

BRIEF DESCRIPTION OF THE DRAWINGS

FIG. 3 is a flowchart that shows the main steps performed by embodiments of the invention to intercept and efficiently process kernel calls made by applications.

DETAILED DESCRIPTION

In broad terms, embodiments provide a software middleware layer that, transparent to applications, aggregates compute coprocessors and can present them to applications as a single abstract device. Applications may thereby call to the single abstracted, aggregated device, and an internal runtime splits and distributes the workload automatically to multiple coprocessors, achieving high performance without the effort and other disadvantages of existing software that supports multiple coprocessors. As is described in greater detail below, embodiments determine available coprocessor resources and build up, either offline or through real-time observation, or both, a data set indicating not only each resource's performance characteristics, but also, depending on the task, its input-output relationship, so as to better inform a decision about how to divide the task into portions that can be carried out by different ones of the available coprocessors. Thus, whereas prior art systems generally divide up a task for parallel processing in a static, pre-determined manner, or require modification of applications or of the software components associated with coprocessors, embodiments of the invention may determine sub-task assignment intelligently, dynamically, and transparently, with no need to modify system software or running applications themselves.

Embodiments may thus offload computationally intensive parts of an application onto a set (pool) of high-performance coprocessors designed to process those tasks with high efficiency. This in turn allows multiple applications to target the same pool of coprocessors, thereby increasing the overall utilization of these coprocessors. This invention describes a hardware abstraction layer that achieves the overall aforementioned goals.

Figure 1:
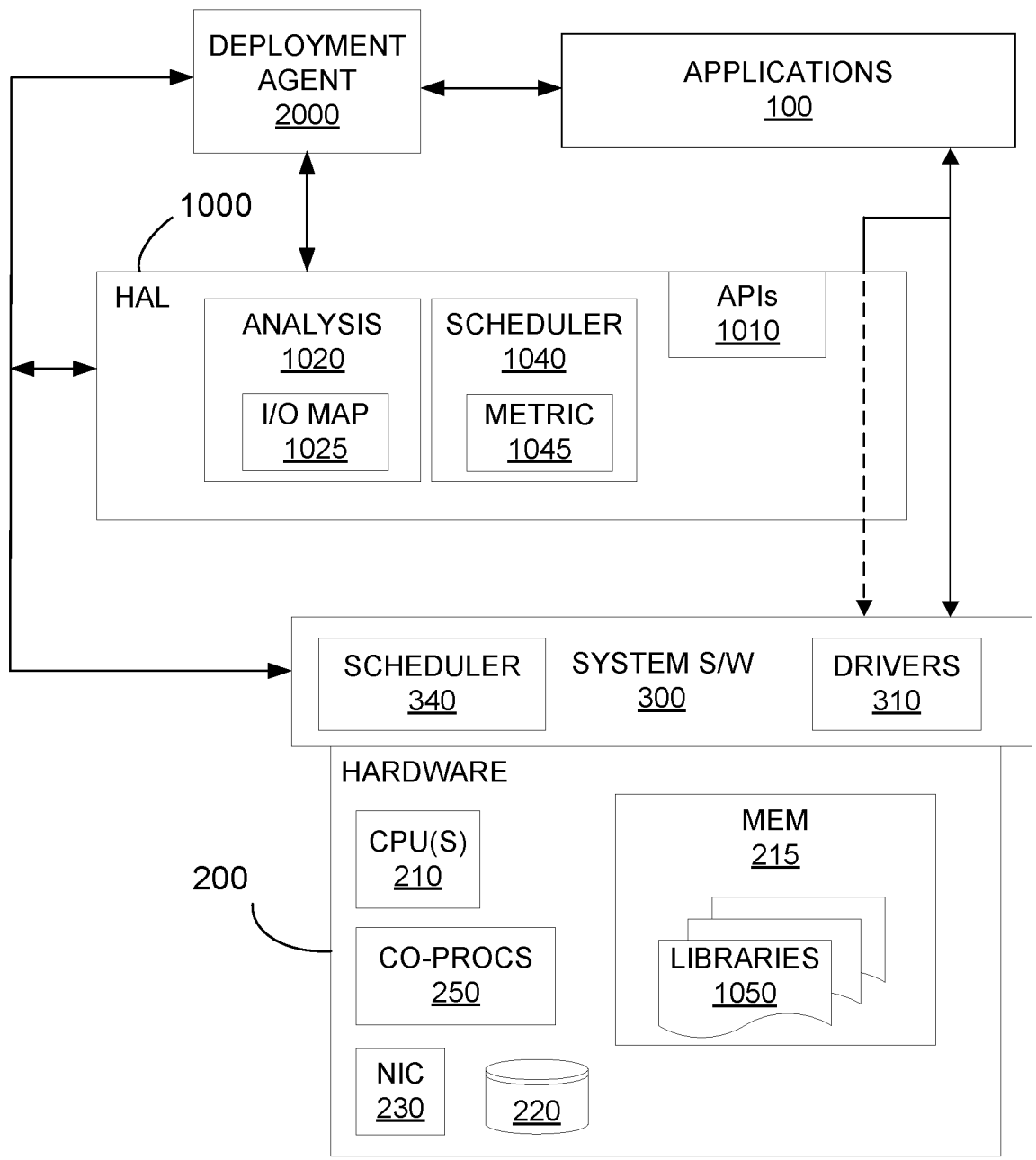
FIG. 1 illustrates the main hardware and software components of a computer system that incorporates "virtualized aggregation" of coprocessors.

FIG. 1 illustrates one example of a hardware/software stack in which applications 100 run on a host hardware platform 200, typically under the control of a system software layer 300 such as an operating system (OS). In addition to other standard components, the hardware platform will include one or more processors 210, volatile (such as RAM 215) and usually non-volatile (such as SSD, disk, etc., 220) storage components, as well as components for communicating with other systems over a network and other peripherals as needed, for example, network interface components 230. As is well understood, both user-level applications and system-level software processes are generally embodied as computer-executable code that is stored in either storage 220, memory 215, in a device's dedicated storage/memory, etc., and that is then loaded into the appropriate to the processor(s) or coprocessors for execution.

Depending on the configuration, the hardware platform 200 may also include one or more coprocessors 250, such as graphics processing units GPUs; these may, however, also be located within other systems, accessible via any standard buses or networks, such that the concept of "hardware platform" may be broadened to include such "peripheral" or even remote coprocessors, such as coprocessors in cloud computing environments. Embodiments may also be used in other forms of distributed systems, such as a software-defined infrastructure (SDI). Although not shown, coprocessors may also have dedicated components of their own, such as memory. The applications 100 may also be running in a distributed processing environment, with more than one server handling processing tasks.

Coprocessors typically have a "master-slave" relationship relative to the normal host CPU(s) 210 that runs the applications—an application is typically run on the host CPU(s) while certain computational tasks are offloaded to coprocessors for increased performance. Compute APIs, that is, APIs that are used by applications to leverage coprocessors, have explicit functions to offload computation and move data between host memory and coprocessor device memory.

The API for each coprocessor, accessible by the overall system, is known and exposed to the applications that may wish to use them. Some of these APIs will be open, that is, public, whereas others may be customized for certain coprocessors. Even in the case of customized APIs, however, these will be known to all applications that may need to use the corresponding coprocessor. Since the coprocessors available at any given time are known to the system, their APIs are also known. As is known, applications 100 are programmed to properly format API calls to the coprocessors they wish to use and, in many cases, the APIs that each application will call into may also be known in advance.

Embodiments of the invention have several features not found in the prior art, and offer corresponding benefits. For example, a hardware abstraction layer (HAL) is provided that may run in user space, that is, not necessarily in system software such as an OS or hypervisor, or in an application 100. Thanks to this, the invention can be portable, installed in a wide range of environments. Moreover, because the HAL may run in a non-privileged execution mode, security and data confidentiality may be enforced without compromising the system with additional privileged code. Furthermore, unlike other approaches, additional features can be introduced into the HAL without having to change the underlying operating system, drivers, or virtual machine hypervisors.

System software, such as a host operating system 300, is generally included to perform well-known functions, and will typically include drivers 310 that control communication with respective peripheral devices. The software—including the applications, the system software itself (and the hardware abstraction layer (HAL) 1000, described below)—that runs on the hardware platform is generally processor-executable code that is embodied in the storage components, although some instructions especially for specialized devices may also be permanently stored in the devices themselves.

In many modern computing environments, the application layer 100 includes, and sometimes is even totally comprised of, one or more virtual machines (not shown), in which case the system software 200 may include a system-level virtualization component such as a hypervisor, which acts as the virtual-to-physical interface. In some systems, the hypervisor is co-resident with the host OS, with both operating in a privileged mode; in other systems, the host OS intermediates some or all hypervisor commands to the hardware; in still other systems the hypervisor replaces the host OS altogether; and in systems without virtualized components such as VMs, no hypervisor may be needed and included at all. Embodiments of this invention do not require VMs, although they may operate with VMs as with any other applications that call coprocessors; moreover, system programmers will be able to adapt embodiments to different host OS/hypervisor configurations, including those with no separate host OS at all.

Applications generally include various core functions, such as the routines needed to communicate processing requests to the operating system, to access the file system, allocate memory, and access common functional libraries for operations such as data compression, image manipulation, accelerated math functions, etc. Compute APIs, specifically, deal with the management of coprocessors, execution flow, and data movement, to make full and efficient use of the coprocessors. This includes dispatching data and compiled compute routines, returning status information, and synchronizing streams of execution between the coprocessors and other coprocessors, and the coprocessors and the host system. In the context of embodiments of this invention, one function of some applications is to properly format and issue calls to application program interfaces (APIs), and to dispatch kernels associated with devices such as coprocessors. As is well known, an API comprises routines and protocols that specify how software components should interact, how a software component such as an application may interact with a hardware component, etc. Of particular relevance here is that an API is usually included to form an interface between applications 100 and coprocessors 250.

OpenCL (Open Computing Language) is a well-known and widely used language for cross-platform, parallel programming of diverse processors. OpenCL is often used, for example, in APIs. Various features of embodiments of the invention, in particular, APIs, kernels and libraries, are therefore described below in OpenCL terms. This is just one design choice, however, and skilled programmers will know how to use any other parallel language or paradigm to implement these software components. Examples of such alternatives include CUDA, SQL, MPI, OpenMP, and OpenACC.

System software and certain other components generally run at a "privileged" level, meaning that they are allowed to issue, and have executed, instructions that affect such things as storage protection settings, interrupt handling, scheduling, I/O coordination, special processor status and register settings, etc. Applications, on the other hand, typically operate in a non-privileged user space, that is, in user mode.

For many tasks often assigned to coprocessors, there may be one or more functions that are carried out so often, or are so specialized, that it is common to implement them in code in a way that is easy for different applications or processes to invoke, once or repetitively. Different programming languages may refer to these code modules as "subroutines", "subprograms", "functions", "methods", etc. Prototypes of embodiments of the invention were written in OpenCL, for example. In many cases, the code modules that implement these functions are made available in or accessible as "libraries", which thus may provide various sets of functionality. Libraries may be both open and custom and may include various existing system libraries. Libraries may be provided by device vendors, or by vendors of libraries themselves (such as mathematics library packages), or written by users themselves, such as for highly specialized and less common types of calculations. As just two of a substantially limitless number of examples, libraries exist in many different programming languages to perform matrix operations fast, or to numerically solve certain differential equations, etc.

Embodiments of this invention do not presuppose that the code stored to embody a library, that is, to perform some process, is necessarily a sub-routine, that is, some smaller part of a larger body of code; rather, libraries provided for different tasks could include entire applications as well. In other words, the difference between a sub-routine or an application is, in the context of this invention, mostly insubstantial, semantic, and non-limiting.

In the illustrated example, which reflects prototypes, OpenCL libraries are assumed. An OpenCL library typically has two components: a Host component, which is usually (but not necessarily) general and often device-independent, and a Device component, which is typically more specific to a given hardware vendor. For example, the code that defines the computational steps to invert a matrix may be the same regardless of which device is to carry out those computational steps, but different coprocessors that might be called to carry out the steps may have different input formats or floating-point number conventions.

Figure 2A:
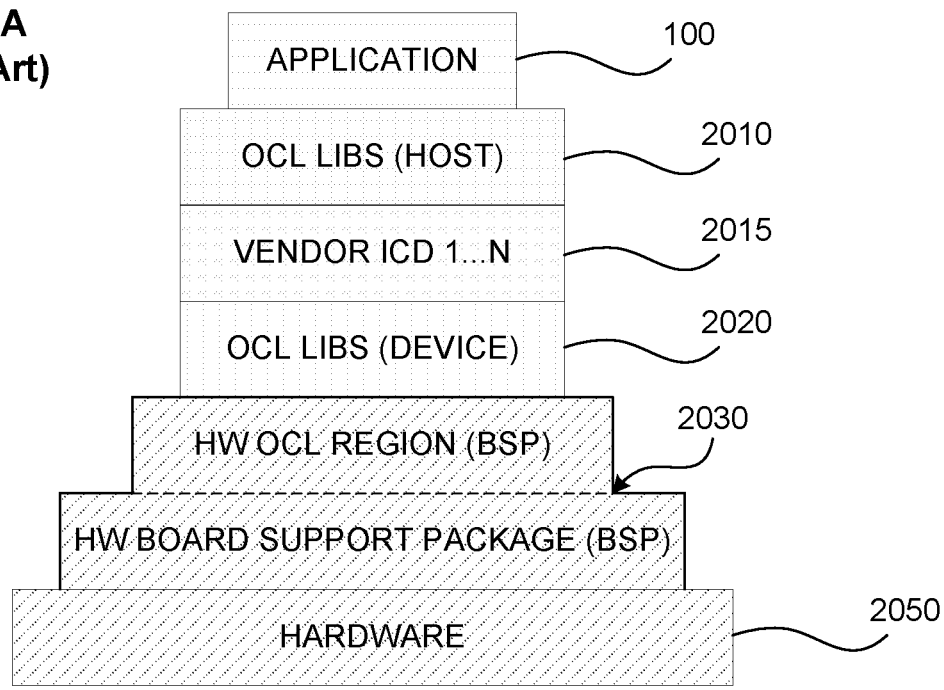
FIG. 2A illustrates a typical prior art software/hardware stack and the procedure applications use to access a coprocessor resource.
Figure 2B:
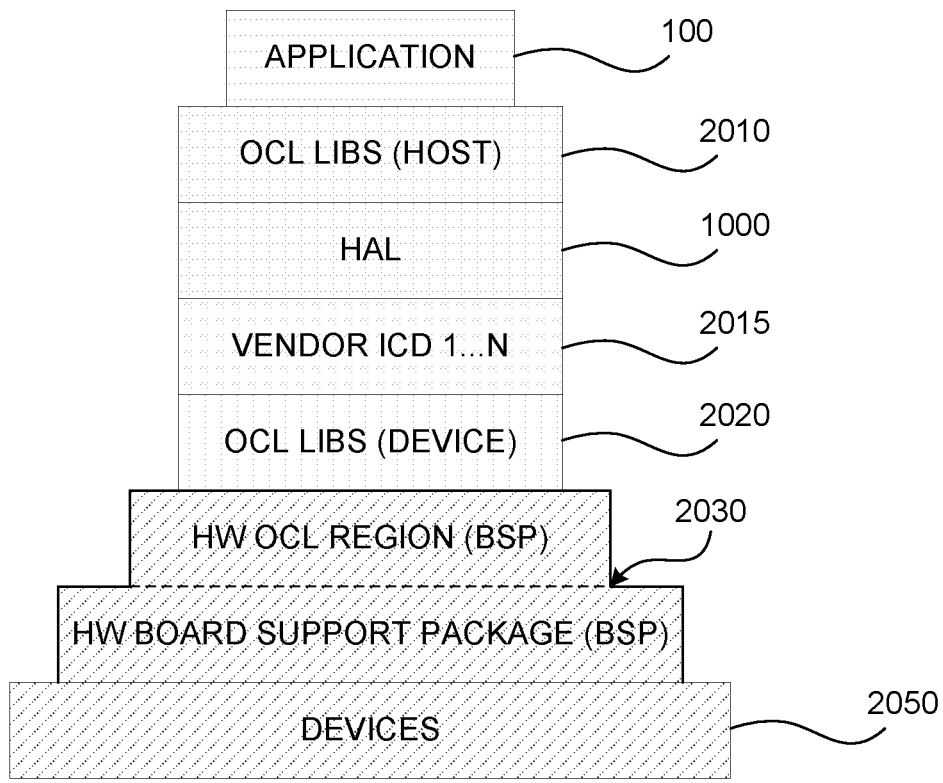
FIG. 2B illustrates how the software/hardware stack is modified according to the invention by the interposition of a hardware abstraction layer for virtualized coprocessor aggregation.

In FIGS. 2A and 2B, these two library components (host and device) are numbered 2010 and 2020, respectively. The libraries 2010, 2020 may be implemented using any chosen data structure and may be stored in, for example, system memory 215, which references libraries collectively as 1050. The location of the libraries 1050 within the memory 215 is shown merely by way of simple and convenient illustration, although it is one possibility. One or more of the libraries may instead be located within devices 250 themselves, or within components of the system software, within the HAL, within applications, or even remotely, such as in a remote vendor or other server. As with other code, however, when it is time to execute the code in a library, it will be loaded into some high-speed memory component directly accessible by the processor(s) 210 or coprocessors 250.

Embodiments of this invention provide a layer—the aforementioned Hardware Abstraction Layer (HAL)—labelled 1000 in FIG. 1, that may run at the non-privileged, user level and that intercepts and handles some application calls to system-level resources, in particular, coprocessors; other calls may be allowed to pass directly to the system software for handling as usual. The HAL 1000 may be provided in addition to other existing intermediate software layers; alternatively, the HAL components described here may be included in an existing intermediate layer. The HAL 1000 includes various software components such as application programming interfaces (APIs) 1010. Other components in the HAL 1000 include an analysis module 1020 and a scheduler 1040, whose functions are described below. Although these modules are shown as being in "the" hardware abstract layer 1000, one or more of them could also be included in some other software layer, including dedicated layers. In other words, the concept of a "layer" may encompass more than one separately created software component that cooperates with others to perform the functions described herein for the HAL.

The HAL 1000 is preferably configured so as not to require any changes to the applications running above, or modifications to the system software on which the layer itself runs. In other words, embodiments may run on commodity systems. Although this configuration leads to advantages such as ease of installation and use, portability, universality, and convenience, other configurations are possible. For example, the HAL could be installed at the privileged level, and could even be incorporated into system software, in the OS or a hypervisor.

The code that comprises the HAL may be installed in the system and configured using any known method, including downloading it from a network, reading in the code from a tangible, non-volatile storage medium, etc. This is in fact one advantage of the invention: It may be installed like other user-level applications, including applications that interact with other applications, with no need to modify the system software or include dedicated or modified hardware. Embodiments may also include a privileged-level deployment agent (described below) to configure the HAL, populate the various libraries, etc.

As used here, a compute "kernel" is a routine that is compiled for a coprocessor and will typically be separate from a main program. Conceptually, a compute kernel is similar to a "loop" or "subroutine" within a more general body of code and that is to be executed on a device, such as a coprocessor, that typically will have greater performance with respect to the kernel task than the main CPU.

For example, a specialized coprocessor, such as a GPU, will normally be much faster than a CPU at performing the large number of essentially repetitive computations on video data. On the other hand, for example, whereas user input can often affect the execution of a CPU, a coprocessor generally acts as a kind of "black box", taking a predetermined set of input data and generating corresponding output data.

An OpenCL kernel is based on a Single-Instruction, Multiple-Data (SIMD) model of parallel computation, in which a large amount of data is typically divided into portions. The kernel, which is dispatched to a chosen coprocessor (or other device), is then designed to cause the same computation to be performed on each portion. Different SIMD routines generally perform better on different types of processors. An application therefore first preferably determines the context/environment in which it needs work done, so that it will know which processing resources are available, as well as other related information such as how much memory is accessible by each device, how many cores each coprocessor has, etc. Based on each context, an application will generally also establish at least one dispatch queue to enable scheduling of kernels.

Separate queues may, as one design choice, be established based for a particular coprocessor, for a particular type of coprocessor, or based on other considerations, and each queue may typically hold an arbitrary number of kernels. Each dispatch queue, however, is typically attached to a particular device type, although the application may not necessarily know, or need to know, to which device of a given type a given kernel is dispatched.

Now see FIG. 2A, which illustrates a conventional OCL stack, thus showing some of the components currently involved when an application submits for execution a task that involves a coprocessor. Characteristics of available devices, including which devices these are, are available from OCL Libraries 2010, 2020, which may be included in the host platform or the devices themselves. The application may then use standard OpenCL calls through respective vendor Installable Client Drivers (ICDs) 2015 to create a standardization and abstraction layer for the application-specific libraries. As part of the call, the application will include any required execution parameters, as well as various inputs, which may include data, address ranges and indices, etc. The call may then pass to the actual target hardware device 2050 (such as the respective coprocessor) through the associated OCL region and other components of the corresponding board support package (BSP) 2030. The designated device may then run to complete the task.

FIG. 2B illustrates the modification to the OCL stack that embodiments of the invention provide and use. In particular, the HAL 1000 is interposed between, on the one hand, the applications 100, and, on the other hand, the drivers 2015, the BSP 2030 and the device(s) 2050; moreover, the libraries 2010, 2020 are accessible by the HAL 1000.

Now consider what happens when an application wishes to call a device such as a coprocessor. The application writes inputs to the device, then dispatches the corresponding kernel that the device is to run. When the device has completed the task associated with the kernel, there will in most cases be memory artifacts, in particular, memory changes, that are written back to the host. From the perspective of an application, the coprocessor can typically be viewed as a "black box" in that it accepts input parameters, a kernel that defines what it is to do, and then returns some form of output(s). In so doing, the coprocessor will affect the memory, which it must use not only for storing its inputs and outputs, but also for intermediate values it generates during its computations or other operations. The memory locations (addresses) the coprocessor uses are observable using known techniques.

Now assume that a particular operation or computational task can be decomposed into a series of sub-tasks. Just as a simple example, assume that the task comprises two sub-tasks. In some cases, the two sub-tasks may be carried out independently of each other, with their respective results being used by the calling application either independently, or being combined in the application for some other purpose. In some other cases, the result of the first sub-task may form all or part of the input values used by the second sub-task, such that they are carried out serially. The results of the two sub-tasks might even together form inputs to yet another sub-task.

Existing heterogeneous systems usually handle these situations in different ways. Many simply don't "deal" with them at all, in the sense that they simply schedule the main task without regard to how it can be decomposed into sub-tasks, focusing rather on either better scheduling of multiple kernels on a single coprocessor, or on reducing the bottleneck caused by memory accesses needed by different jobs being run concurrently on a single coprocessor. In some other cases, the prior art divides up the main task, but assumes that it is amenable to parallel processing, with the same algorithm being run with different inputs by different coprocessors.

The invention takes a different approach in that it makes use of the ability to know the characteristics of different kernels, both individually and with regard to how they interact with each other and with memory. Transparent to applications, the HAL, in particular, an analysis module 1020, identifies the dispatched kernels, any data dependencies among the kernels, and then dynamically schedules (using a scheduler 1040) the kernels to run on respective (or even the same) coprocessors to increase performance. Note that, among other advantages, this means that different coprocessors may complete different types of computational tasks for the same application, that the scheduling may take into account special kernel data dependencies that existing systems cannot, and that, thanks to the transparency of the HAL, the pool of available coprocessors may be changed easily without applications having to be made aware of this.

Depending on the nature of the task that a single kernel is designed to complete, an intra-kernel embodiment of the invention enables splitting of processing of a single kernel so that different parts can be assigned to run on different coprocessors, even, depending on data dependencies, simultaneously. For example, some part of a kernel might involve one type of computation or data transfer that is either independent of or whose result is an input or initial state for another type of computation in the same kernel; in other words, to the extent that a single kernel can be decomposed into separate sub-sections, these sub-sections could be assigned to different co-processors for either parallel (if no data dependency) or serial (with data dependency) computation, where each co-processor is chosen to increase the overall efficiency (such as minimum completion time) of the execution of the kernel. In the discussion below, embodiments are described in the context of data dependency among different kernels (kernel level granularity), although the techniques may be extended to intra-kernel embodiments as well sub-kernel level granularity).

Associated with each kernel is a unique "signature" by which it can be identified. This signature includes the name of the function and all of its parameter data types. The code defining kernels is typically (but not necessarily) stored simply as a text file that is compiled at run time; as such, this file may be queried to determine which functions it requires computations for. For example, a kernel might include a matrix inversion function as well as a matrix rotation.

In some cases, kernels are structured in predictable groups: kernel K0 executes, followed by K1, which uses the output of K0, and so on. According to one embodiment, the HAL (using either the analysis module 1020 or scheduler 1040, which may be implemented as a single software component) examines the kernel dispatch queue of an application and determines, based on the signatures of the enqueued kernels, which are to be dispatched. Rather than the application dispatching the kernels, however, the HAL "intercepts" them, transparent to the application, and determines its own scheduling.

If two or more kernels in the dispatch queue have no data dependencies, they may be scheduled for parallel processing (if sufficient resources are available when needed). If however, the input of kernel K1 requires results of operations performed by K0, there is a data dependency and the kernels may be scheduled to run serially instead. Note, however, that data dependency does not, using embodiments of this invention, imply that the same processing resource must be used to execute K0 and K1; indeed, one of the advantages of the invention is precisely that different compute resources may be assigned to run different kernels, with various metrics being made available to inform an efficient distribution of effort. Note that although examples of embodiments of the invention may be described here with reference to two kernels (or kernel sub-sections), such as K0 and K1, embodiments may be used with any number of kernels in a dispatch queue of an application, and with any number of such applications.

The application dispatches the kernels, but the HAL intercepts this stream and processes it instead of allowing it to pass to the respective devices. The HAL also copies all the data relating to those kernels. The HAL may then also identify and eliminate any inter-kernel data redundancy by storing and referring to only a single copy. This can significantly reduce the demand the HAL might otherwise make on memory for tasks that involve different kernel operations on large data sets such as often occur in graphics processing.

As a simple example, assume that kernel K0 operates on data[0-15] and kernel K1 operates on data[16-31]. It would be inefficient to copy data[0-31] for both K0 and K1, since each uses only half of the data elements. By automatically determining the data dependencies for each kernel, the HAL can significantly reduce the amount of memory copies (and therefore bandwidth) required for each kernel to execute. Without this step, workloads would not performance-scale to increasing number of coprocessors, since memory bandwidth is a scaling limiter.

As mentioned above, execution of a kernel, or even a part of a kernel, typically has a detectable input-output relationship and effect on memory; in other words, the kernel identified by its signature will cause observable changes to certain bytes of memory. The analysis module may observe such a dependency indirectly, by noticing which memory locations are used by one kernel, or kernel portion, to write and which memory locations are read in by the second part.

In some cases, the HAL may be configured to more pro-actively determine data mappings for different kernels. For example, the HAL may identify loaded applications in any known manner, and then examine their code to find kernel signatures even before the applications put the kernels in their respective dispatch queues; alternatively, the HAL could wait until the kernels are queued, but before they are dispatched. Instead of waiting to it could "pre-fetch" the kernels and apply "test" data to them as inputs to determine which memory addresses are used and possibly shared in an input-output relationship by different ones of the kernels.

It may also be possible to observe the dependency directly, by analysis of the respective kernel's code. The data dependencies (in particular, output-input relationships) may in such case be determined in advance, since these will be apparent from the kernel code, especially in the case of intra-kernel analysis and decomposition. As a very simplified illustration of the concept, assume that a part of a kernel creates an output x that is computed within that part and x is one of the input parameters to a second part of the kernel. It is then possible for a module such as the analysis module 1020 to see this dependency.

Given the dependencies, the analysis module may then store in a data structure 1025 an input-output mapping, that is, data that indicates which memory locations output by one kernel are input to another kernel portion. The memory locations may be physical or virtual. In some cases, it may not be necessary to know the entire address range of all device outputs in order to format a proper input to the following device; in such cases, as long as the pattern of bytes is known, the system may optionally copy only the bytes necessary to ensure proper outputs. The mapping structure 1025 may change from run to run, depending on how devices are scheduled to run kernels and how much of the workload each device is assigned to handle. The analysis module may therefore also create and build up a configuration file that tracks I/O change patterns. In the worst case, the HAL will have no dependency information at all, and will then simply have to copy all inputs for all devices.

Once the input-output (or, actually output-input) relationships are determined, the HAL's scheduler 1040 schedules execution of the kernels (or kernel sub-sections) on the available devices, that is, in this example, coprocessors. Assume by way of the simplest example that there are two coprocessor devices. (In many practical implementations, there may be more than two, which need not be of the same type.) As mentioned above, the architected performance characteristics of these devices may be made available in the different libraries.

A simple choice might be just to run one half of the kernel on one device, and the other half of the second device, while keeping track of data dependency via observation of memory accesses.

Even if the devices are otherwise identical, however, this may not be the most efficient choice. For example, one of the devices might at that moment have a greater workload. In many configurations, the devices may not be identical, such that one device might be faster or better suited or even specially designed for computing a certain type of function. For example, if one device is three times as fast as another, then the HAL scheduler 1040 may choose a 75/25 split of kernel sub-task execution which should, other things being equal, provide better performance. On the other hand, if the faster device currently has double the workload of the slower, then a 60/40 split may be better.

In short, the most efficient "division of labor" when it comes to which coprocessor device should execute which portions of a kernel may be determined by both static and run-time metrics and other information. The HAL scheduler 1040 therefore includes a metric component 1045 that determines such metrics.

The characteristics of the kernel itself may also affect which device is most suitable for execution. For example, one kernel may involve an operation known to take significantly more time to complete than another. Referring again to the example mentioned about, a matrix inversion will take much longer than a simple matrix rotation to complete. In such a case, all other things being equal, it would normally provide the best performance to assign the computationally intensive sub-task to a device that is faster, or is specially designed for that sub-task, or that currently has a lower workload. The determination of how to schedule and distribute kernel execution tasks may therefore also be made a function of estimated completion time. The metric module 1045 may therefore include such task-related considerations in its evaluation.

The metric module 1045, or the broader scheduler 1040 code, may determine state and characteristics of the available devices, as well as the list of which those devices are, from information made available by the operating system, by querying the hardware platform, by observing memory accesses, or by using other known techniques. The nature of operations called for within a kernel are also knowable from the identity of the kernel, assuming possible kernels and their included operations are identified in advance.

Even without prior knowledge of a kernel, the metric component 1045 may heuristically build up over time an internal table of kernel execution behavior. Thus, different applications may dispatch the same kernel over time, or a given application may dispatch it multiple times. The metric component 1045 may then, using known methods, observe the actual real-time performance of different execution splits (for example, the 50/50, 75/25, 60/40 mentioned as examples above). Each time a kernel is dispatched to a device, the metric module may measure the device's performance, for example, in terms of work items/second, as well as such "costs" as the time, either in real time terms or processor cycles, of writing data to/from the device. Either it, or the broader scheduler code, may then include this information in the execution split and device scheduling decision. In practice, this involves a weighting of the various static, dynamic, and heuristic (if included) metrics. This weighing may be fixed as a programming design choice, or the scheduler may adjust it for better performance based on observed performance of past scheduling decisions.

Scheduling will of course also depend on the data dependencies of the kernels. For example, if kernel K1 requires as input the output of kernel portion K0, then the scheduler can determine which device(s) is/are best suited (it need not be different devices) to execute K0 and K1, but K1 will not actually run until K0 has been completed.

Note that is will not always be the case that kernels must be run on different coprocessors. In some instances, for example, it may be most efficient to dispatch multiple, data-dependent kernels to a single coprocessor. For example, even though different kernels may involve different computational tasks, it might be the case that one of the coprocessors is specially designed to perform the required computations, and can do so faster on its own than if any part of the tasks is assigned to a different, perhaps less suitable, coprocessor.

Once the scheduler determines which kernel operations are to be assigned to which devices for processing, it may direct the respective kernel portion streams via the OpenCL interface typically provided by the device vendor ICD for translation of the command stream to the respective device drivers for execution. When kernel execution has been completed, that is, all the included functions and other routines defining the kernel have been completed, the kernel results are returned to the dispatching application.

FIG. 3 is a flowchart that summarizes the main features of the processing methodology described above for an embodiment that intercepts dispatched kernels: kernels dispatched by applications are intercepted (3000) and their parameter types are identified (3005). The HAL then looks for inter- (or intra-) kernel data dependencies (3010). If there are no data dependencies between dispatched kernels (3015), two or more of them may be dispatched in parallel (3020), but if there are data dependencies, kernels should be scheduled to execute serially (3025). In some cases, it may also be possible to split data and work (computation) tasks even for a single kernel (3030). The different kernels may then be matched with respective devices (3035), for example, according to any set of metrics (3040), and dispatched to those devices (3045). After completion of kernel execution, the results may be returned to the application that originally dispatched the kernels (3050).

At this point, three advantages of embodiments of the invention should be clear. First, the HAL may be transparent to the applications. One result of this is that the pool of coprocessors may be made to appear to applications as a single node. Second, the HAL may be installed at the user, that is, non-privileged level, such that there is no requirement to modify either applications or system software. Third, the kernel-splitting and scheduling provided by the HAL may take into account many more relevant factors than existing systems, including adjustments based on run-time metrics, and past performance based on other splitting decisions.

Figure 4:
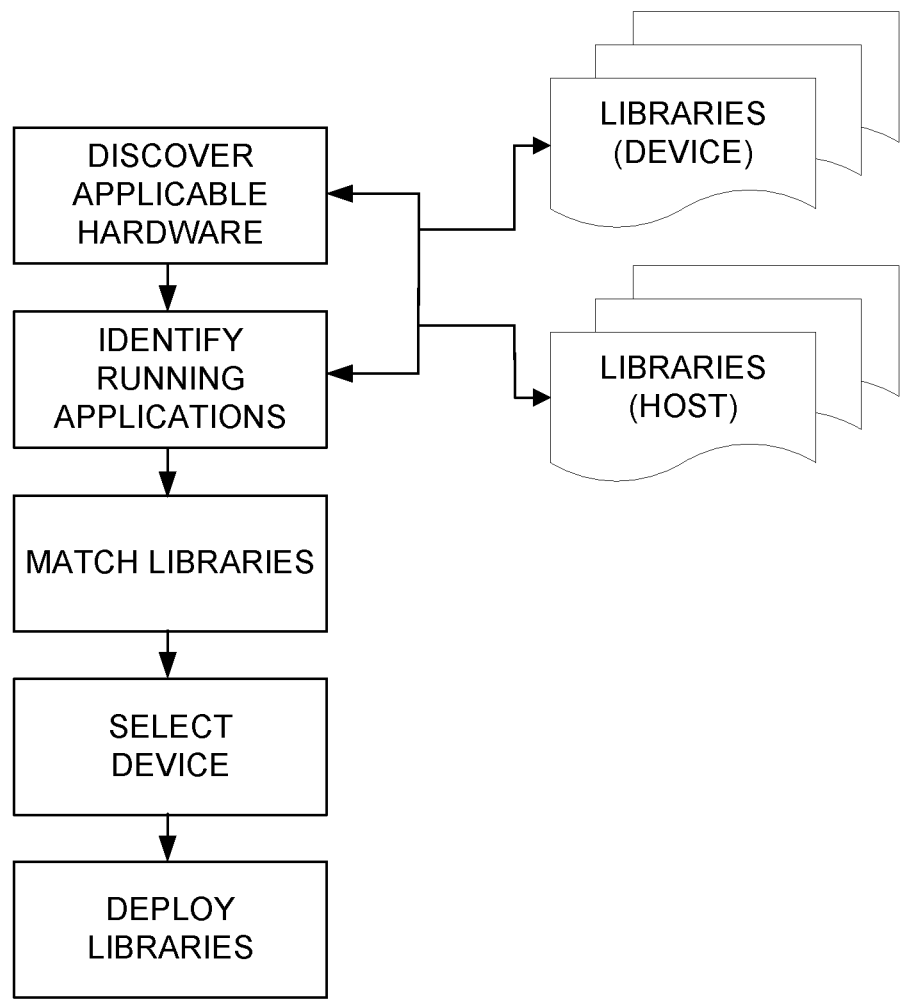
FIG. 4 is a flowchart illustrating some of the main functions performed by an optional deployment agent.

The HAL and some of the various data structures and parameters it either includes or accesses may be initialized in different ways, depending on design preferences. In one embodiment, a deployment agent 2000 (FIG. 1) is included to perform this function. FIG. 4 is a flowchart that illustrates the main functions performed by the deployment agent 2000. In general, the agent identifies hardware and software information and makes it available in libraries for access by the HAL. Note that the agent 2000 may be considered either as a separate software component, or as part the HAL itself. The HAL needs to know what hardware, in particular, processors and coprocessors, is available, and also which applications are running that may call these processing devices using the appropriate kernels. The agent 2000 may determine this information by examining existing identifiers provided via the system software or the applications themselves, or by direct administrator input. For example, when it comes to a kernel, it may be identified by a unique signature, which includes the name of the function it is to perform and all of the parameter data types. The agent 2000 thus may discover applicable hardware and match applications against known signatures. Application-matching may be done either in real-time, as the applications are running, or, in the case where the installed applications are known in advance, the matching may also be done in advance. The agent may then deploy matching device-application libraries to the system, in particular, within the HAL.

As another alternative, the agent (or the HAL itself) could detect the ID of a device, but then download info about its characteristics from an external source over a network. This would allow for the HAL to adapt easily to changing hardware configurations. Analysis of kernels may be uploaded to remote processing system, such as in the "cloud", with results then being fetched as part of an acceleration service. Such a "remote analysis" embodiment may be beneficial in certain time-consuming contexts such as creation of optimized field-programmable gate arrays (FPGAs), for which kernel-data mappings could take a long time, on the order of days, since it typically takes over an hour just to burn a new/optimized kernel.

Libraries may also be deployed either dynamically by modifying the application's relocation table (e.g., the Executable and Linkable Format (ELF) Procedure Linkage Table (PLT) or by automating the above through normal environment variable changes. The libraries may, but need not be the existing ones; rather, the agent may replace an existing library with another, for example, one that leads to faster performance.

Using current technology, properly matching applications to available processing resources is both complicated and restrictive. As one example of the existing complication, to use an optimized library such as in scientific computing, for example, OpenBLAS is an open-source implementation of the BLAS (Basic Linear Algebra Subprograms) API with many hand-crafted optimization versions for specific processor types. Using OpenBLAS, the user faces the following steps and decisions:

1) Pick from among the BLAS implementations and determine which is more appropriate for the target system.
2) Install the appropriate BLAS library.
3) Set LD_LIBRARY_PATH for dependences that match ldd output in optimal order.
4) If library names don't match, LD_PRELOAD
Enable 3) in either per-user or system-wide startup files.
5) In most cases where there are multiple hardware options (for example, multi-core CPU+GPU), the developer must change the application to take advantage of both.
6) When migrating from one system to another one with different available hardware, steps 1-5 must be repeated and the application must be changed to adapt to new OCL libraries. The developer must then be aware of all possible customer hardware options. Most exotic options (FPGAs) will be completely unsupported as a result.

The agent 2000 removes the complexity faced by application developers or users when using OCL libraries and the dynamic optimization features provided by embodiments of this invention.

The HAL may thus determine the characteristics of a kernel and what parameters are involved in its call and operation as soon as an application has dispatched the kernel, or even before, via the information stored in the libraries.

What is claimed is:

1. A data processing method carried out while an application is running, via system software, on a hardware platform that includes at least one processor and a plurality of coprocessors, the data processing method comprising:
   intercepting, by an intermediate software layer, which is installed in a non-privileged, user space to run logically between the application and the system software, without modification of the application or of the system software, first, second, and third kernels dispatched within a data and command stream issued by the application, each said kernel corresponding to instructions to the plurality of coprocessors;
   automatically, and transparently to the application, determining data dependencies among the kernels including determining that an input to the first kernel is an output from the second kernel;
   automatically, and transparently to the application, determining that the third kernel has no data dependencies on the first and second kernels;
   selecting at least one coprocessor to which the first and second kernels are to be dispatched based at least in part on the determined data dependencies;
   selecting another coprocessor to which the third kernel is to be dispatched based at least in part on the third kernel having no data dependencies on the first and second kernels;
   dispatching the first and second kernels to the selected at least one coprocessor and the third kernel to the selected another coprocessor; and
   returning kernel results to the application.

2. The data processing method of claim 1, wherein the first, second, and third kernels each include a plurality of kernel tasks.

3. The data processing method of claim 1, further comprising:
   selecting which of the coprocessors to dispatch each kernel to as a function of relative performance characteristics of the respective coprocessors.

4. The data processing method of claim 1, wherein the input to the first kernel is determined to be the output from the second kernel by determining that a memory location to which the second kernel writes is the same memory location from which the first kernel reads.

5. The data processing method of claim 1, wherein the input to the first kernel is determined to be the output from the second kernel by pre-fetching the first and second kernels, applying test data to the first and second kernels, and determining that a memory location to which the second kernel writes is the same memory location from which the first kernel reads.

6. The data processing method of claim 1, wherein the input to the first kernel is determined to be the output from the second kernel by analyzing code of the first and second kernels.

7. A non-transitory computer readable medium comprising instructions that are executable in a computer system to cause a hardware platform of the computer system that includes at least one processor and a plurality of coprocessors to carry out a data processing method while an application is running thereon via system software, the data processing method comprising:
   intercepting, by an intermediate software layer, which is installed in a non-privileged, user space to run logically between the application and the system software, without modification of the application or of the system software, first, second, and third kernels dispatched within a data and command stream issued by the application, each said kernel corresponding to instructions to the plurality of coprocessors;
   automatically, and transparently to the application, determining data dependencies among the kernels including determining that an input to the first kernel is an output from the second kernel;
   automatically, and transparently to the application, determining that the third kernel has no data dependencies on the first and second kernels;
   selecting at least one coprocessor to which the first and second kernels are to be dispatched based at least in part on the determined data dependencies;
   selecting another coprocessor to which the third kernel is to be dispatched based at least in part on the third kernel having no data dependencies on the first and second kernels;
   dispatching the first and second kernels to the selected at least one coprocessor and the third kernel to the selected another coprocessor; and
   returning kernel results to the application.

8. The non-transitory computer readable medium of claim 7, wherein the first, second, and third kernels each include a plurality of kernel tasks.

9. The non-transitory computer readable medium of claim 7, the data processing method further comprising:
   selecting which of the coprocessors to dispatch each kernel to as a function of relative performance characteristics of the respective coprocessors.

10. The non-transitory computer readable medium of claim 7, wherein the input to the first kernel is determined to be the output from the second kernel by determining that a memory location to which the second kernel writes is the same memory location from which the first kernel reads.

11. The non-transitory computer readable medium of claim 7, wherein the input to the first kernel is determined to be the output from the second kernel by pre-fetching the first and second kernels, applying test data to the first and second kernels, and determining that a memory location to which the second kernel writes is the same memory location from which the first kernel reads.

12. The non-transitory computer readable medium of claim 7, wherein the input to the first kernel is determined to be the output from the second kernel by analyzing code of the first and second kernels.

13. A data processing system comprising:
   a hardware platform that includes at least one processor and a plurality of coprocessors;
   an application running on the hardware platform via system software; and
   a hardware abstraction layer installed in a non-privileged, user space and running logically between the application and the system software, wherein the hardware abstraction layer is configured to:
      intercept, without modification of the application or of the system software, first, second, and third kernels dispatched within a data and command stream issued by the application, each said kernel corresponding to instructions to the plurality of coprocessors,
      automatically, and transparently to the application, determine data dependencies among the kernels including determining that an input to the first kernel is an output from the second kernel, automatically, and transparently to the application, determine that the third kernel has no data dependencies on the first and second kernels, select at least one coprocessor to which the first and second kernels are to be dispatched based at least in part on the determined data dependencies, select another coprocessor to which the third kernel is to be dispatched based at least in part on the third kernel having no data dependencies on the first and second kernels, dispatch the first and second kernels to the selected at least one coprocessor and the third kernel to the selected another coprocessor, and return kernel results to the application.

14. The data processing system of claim 13, wherein the first, second, and third kernels each include a plurality of kernel tasks.

15. The data processing system of claim 13, wherein the hardware abstraction layer is further configured to select which of the coprocessors to dispatch each kernel to as a function of relative performance characteristics of the respective coprocessors.

16. The data processing system of claim 13, wherein the hardware abstraction layer determines the input to the first kernel to be the output from the second kernel by determining that a memory location to which the second kernel writes is the same memory location from which the first kernel reads.

17. The data processing system of claim 13, wherein the hardware abstraction layer determines the input to the first kernel to be the output from the second kernel by prefetching the first and second kernels, applying test data to the first and second kernels, and determining that a memory location to which the second kernel writes is the same memory location from which the first kernel reads.

18. The data processing system of claim 13, wherein the hardware abstraction layer determines the input to the first kernel to be the output from the second kernel by analyzing code of the first and second kernels.

* * * * *